United States Patent

Lin

(10) Patent No.: US 6,700,257 B2
(45) Date of Patent: Mar. 2, 2004

(54) BEARING FIXED ASSEMBLY IN A DIRECT CURRENT FAN

(75) Inventor: Johnny Lin, Kaohsiung (TW)

(73) Assignee: Asia Vital Components Co., Ltd. (TW)

( * ) Notice: Subject to any disclaimer, the term of this patent is extended or adjusted under 35 U.S.C. 154(b) by 63 days.

(21) Appl. No.: 09/991,406

(22) Filed: Nov. 14, 2001

(65) Prior Publication Data

US 2003/0042811 A1 Mar. 6, 2003

(30) Foreign Application Priority Data

Aug. 31, 2001 (TW) .................................... 90214991 U

(51) Int. Cl.[7] ................................................ H02K 5/16
(52) U.S. Cl. ........................................ 310/90; 310/67 R
(58) Field of Search ................................ 310/90, 67 R, 310/91

(56) References Cited

U.S. PATENT DOCUMENTS

| | | | | |
|---|---|---|---|---|
| 5,610,462 A | * | 3/1997 | Takahashi | 310/90 |
| 6,084,328 A | * | 7/2000 | Yamashita et al. | 310/90 |
| 6,183,221 B1 | * | 2/2001 | Hsieh | 417/423.12 |
| 6,356,408 B1 | * | 3/2002 | Nii et al. | 360/98.07 |
| 6,376,946 B1 | * | 4/2002 | Lee | 310/67 R |

* cited by examiner

Primary Examiner—Dang Le

(57) ABSTRACT

A bearing fixed assembly in a direct current fan includes a fan base, a motor unit, and a fan blade unit.
The motor unit fits with the fan base and the fan blade unit is attached to the fan base and the motor unit with a spindle to constitute an integral structure. The fan base at the top thereof has an annular recess to form an inner ring and an outer ring and at the lower central area thereof has a closed chamber filled with lubrication oil. A stop ring is disposed in the annular recess to support the outer ring such that the motor unit can be sustained from deviation.

1 Claim, 2 Drawing Sheets

BEARING FIXED ASSEMBLY IN A DIRECT CURRENT FAN

BACKGROUND OF THE INVENTION

1. Field of the Invention

The present invention relates to a bearing fixed ASSEMBLY in a direct current fan, and particularly to an improvement of bearing fixed device in a direct current fan, which provides a closed type oil chamber to enhance the function the bearing in the fan.

2. Description of Related Art

Presently, it is known that the computer is one of required equipment for a personal individual or a company and the user much emphasizes whether the executing speed of the central processing unit is fast or not. However, an extremely high speed during executing the central processing unit may result in an excess high temperature to damage the central processing unit or chips in the computer. In order to reduce the temperature of the central processing unit effectively, a radiator and a fan are carried with the central processing unit.

A conventional fan, as shown in FIG. 1, comprises a fan blade unit 10', a motor unit 20', and a fan base 30'. The motor unit 20' is mounted on the fan base 30' and the fan blade unit 10' is axially mounted in a spindle seat 31' of the fan base 30' by way of a spindle 12'. An oil seal ring 38a', a washer 37a', an oily bearing 34', a washer 37b', an oil seal ring 38b', and a retaining ring 32' are sequentially mounted around the spindle 12. The oil seal rings 38a', 38b' and the washers 37a', 37b' constitute sealings for the oiled bearing 34', but the structure of the conventional fan is involved in many drawbacks, which are summarized in the following:

1. A lot of components have to be used and it leads to a high material cost with a tedious assembling job so that it results in a high expenditure of labor and working hour.
2. It is unable for the lubrication oil to be stored sufficiently.
3. The lubrication oil is volatilized easily.
4. It is not possible for the bearing to be lubricated sufficiently and it is easy that the bearing becomes out of order with a shortened life span after a period of running.
5. The lubrication oil leaks out and contaminates the fan easily so that it not only makes the label adhered to the fan come off the fan but also causes other component parts being out of order.

SUMMARY OF THE INVENTION

A bearing fixed assembly in a direct current fan according to the present invention comprises a spindle, an oiled bearing, a washer, a retaining ring, and an inner ring to form a closed type oil chamber.

Accordingly, a primary object of the present invention is to provide a bearing fixed assembly in a direct current fan, which has a simple structure with less component parts to save the production and the material costs, and to save labor hours.

Another object of the present invention is to provide a bearing fixed assembly in a direct current fan, with which the lubrication oil may not volatilize easily and can be kept in a state of full amount for the bearing so as to lubricate the component parts thereof sufficiently and to offer the component parts an extended life span.

A further object of the present invention provides a bearing fixed assembly in a direct current fan, which has a closed type oil chamber with a design of leakage proof, so that no component part thereof is contaminated and a label on the fan is unable to come off the fan too.

BRIEF DESCRIPTION OF THE DRAWINGS

The present invention can be more fully understood in the following description with reference to accompanying drawings, in which.

DETAILED DESCRIPTION OF THE PREFERRED EMBODIMENT

Figure 1:
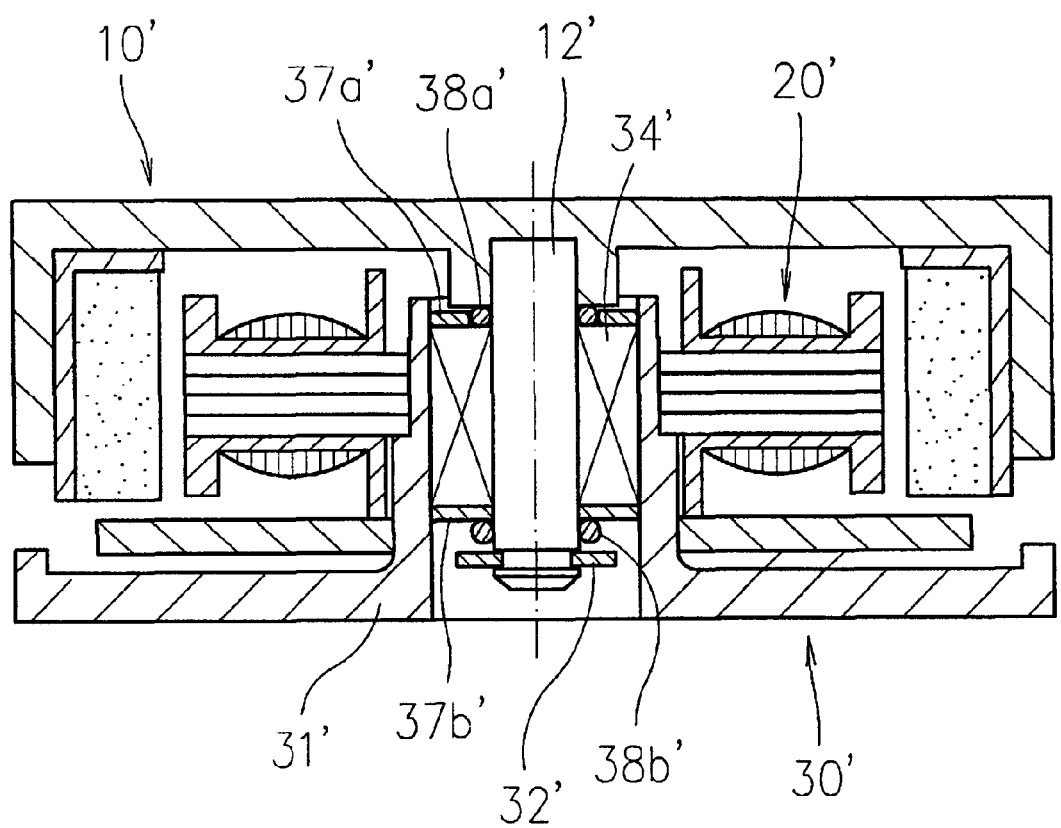
FIG. 1 is a sectional view of a conventional bearing fixed assembly in a direct current fan.
Figure 2:
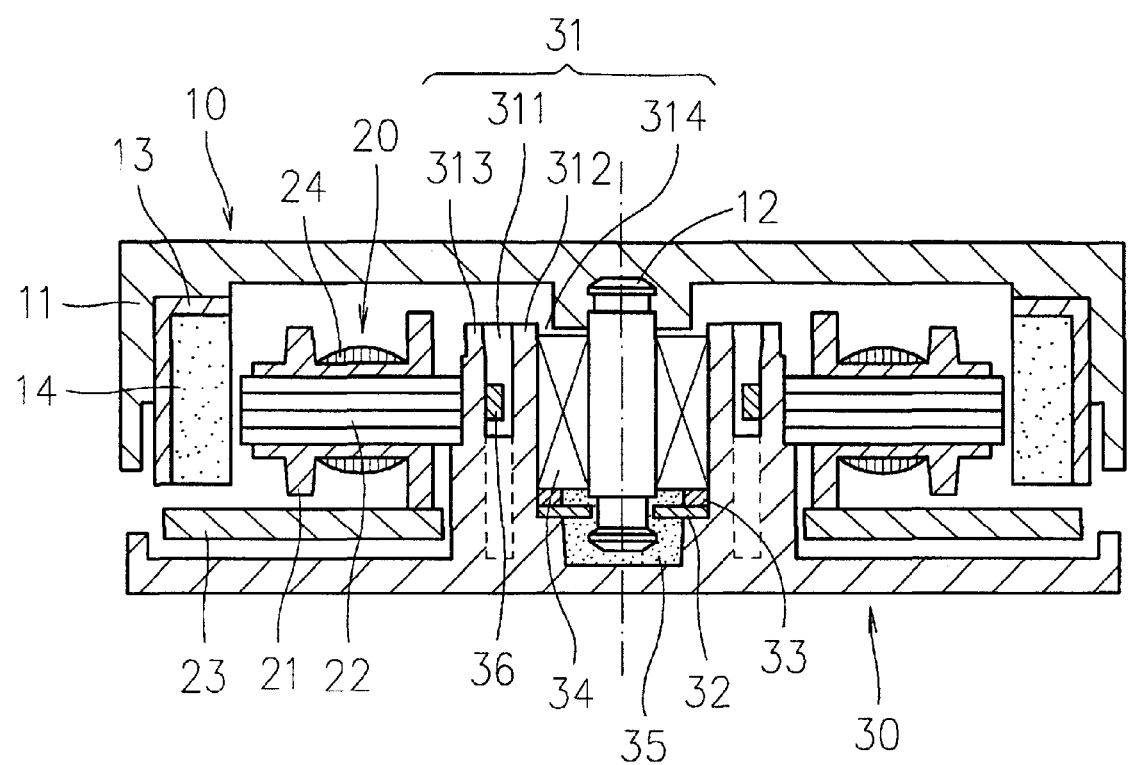
FIG. 2 is a sectional view of a bearing fixed assembly in a direct current fan.

Referring to FIG. 2, a bearing fixed assembly in a direct current fan according to the present invention comprises a fan blade unit 10, a motor unit 20, and a fan base 30. The motor unit 20 fits with the fan base 30 and the fan blade unit 10 is attached to both of the motor unit 20 and the fan base 30 by way of a spindle 12. Hence, the fan can constitute an integral structure.

The fan blade unit 10 is composed of an integral fan blade 11, a spindle 12, a motor casing 13 and a magnet bar 14. The spindle 12 is attached to a lower periphery central position of the fan blade 11 in a way of extending downward. The motor casing 13 is mounted at the inner side of the fan blade 11 and the magnet bar 14 is disposed at the inner side of the motor casing 13.

The motor assembly 20 is composed of an insulation stand 21, silicon steel sheets 22, a circuit board 23, and coils 24. The silicon steel sheets 22 horizontally surround the insulation stand 21 and the coils 24 are wound in the insulation stand 21 in a way of being perpendicular to the silicon steel sheets 22. The circuit board 23 is disposed under the fan blade 11 and next to the fan base 30.

The fan base 30 at the central area thereof has a spindle seat 31 and the spindle seat 31 provides an inner ring 312 and an outer ring 313 respectively so as to form a double layer structure. The preceding spindle 12 of the fan blade unit 10 is located in a space 314 within the inner ring 312 and the space 314 has a closed bottom and is filled with a proper quantity of lubrication oil 35. A retaining ring 32 is disposed in the space 314 between the inner ring 312 and the spindle 12 with a washer 33 being on top of the retaining ring 32. An oily bearing 34 fits with the spindle 12 above the washer 33. Further, the motor unit 20 is mounted around the outer ring 313 and an annular recess 311 formed between the outer and the inner rings 313, 312 has a stop ring 36. The stop ring 36 can support the outer ring 313 so as to perform a function of sustaining the motor unit 20 such that the motor unit 20 is not possible to deviate from the axis thereof or to become loose even if the spindle seat 31 is softened caused by the fan blade 11 running in a long period of time.

It is appreciated from the foregoing that the spindle 12, the oily bearing 34, the washer 33, the retaining ring 32, and the inner ring 312 constitute a closed type oil groove with the following advantages:

1. The structure of the present invention is simple with less component parts so that the production cost, the material cost, the labor power and the working hours can be lowered substantially.
2. The lubrication oil is not possible to become volatilized easily.

3. A large quantity of lubrication oil can be stored in the fan.
4. The bearing can be lubricated sufficiently so that it is possible for the bearing to maintain a longer life span.
5. The closed type oil chamber is leakage proof so that it is unable to contaminate the component parts in the fan, and even the label adhered to the fan may not come off the fan.

While the invention has been described with reference to a preferred embodiment, it is to be understood that modifications and variations may be easily made without departing from the spirit of this invention defined by the appended claim.

What is claimed is:

1. A bearing fixed assembly in a direct current fan, comprising:

a fan base;

a motor unit, fitting with the fan base; and a fan blade unit, being attached to the fan base and the motor unit with a spindle to constitute an integral structure;

characterized in that the fan base at a top thereof has an annular recess to form an inner ring and an outer ring and the fan base at a lower central space thereof is a closed chamber filled with lubrication oil; and a stop ring is disposed in the annular recess to support the outer ring such that the motor unit can be sustained from deviation.

* * * * *